US006362480B1

(12) United States Patent
Peter et al.

(10) Patent No.: US 6,362,480 B1
(45) Date of Patent: Mar. 26, 2002

(54) RADIATION DETECTOR, PARTICULARLY FOR A COMPUTED TOMOGRAPHY APPARATUS

(75) Inventors: Fritz Peter, Spardorf; Claus Pohan, Baiersdorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/391,537

(22) Filed: Sep. 8, 1999

(30) Foreign Application Priority Data

Sep. 10, 1998 (DE) .......................................... 198 41 423

(51) Int. Cl.⁷ .............................. G01J 1/20; G01J 1/24
(52) U.S. Cl. ..................... 250/366; 250/370.11; 378/19
(58) Field of Search ....................... 378/19; 250/370.11, 250/366

(56) References Cited

U.S. PATENT DOCUMENTS 5,917,878 A    6/1999  Peter
6,091,795 A  * 7/2000  Schafer et al. ................ 378/19

FOREIGN PATENT DOCUMENTS

JP          7-333348 A  * 12/1995  ............. G01T/1/20

* cited by examiner

*Primary Examiner*—Constantine Hannaher
(74) *Attorney, Agent, or Firm*—Schiff Hardin & Waite

(57) ABSTRACT

A radiation detector, particularly for a computed tomography apparatus, has a scintillator as well as a photodiode array allocated thereto, these being connected to measuring electronics via an electrical connection. A transparent film with interconnects is arranged between the scintillator and the photodiode array.

7 Claims, 5 Drawing Sheets

RADIATION DETECTOR, PARTICULARLY FOR A COMPUTED TOMOGRAPHY APPARATUS

BACKGROUND OF THE INVENTION

1. Field of the Invention

The present invention is directed to a radiation detector of the type having a scintillator as well as a photodiode array, whereby an electrical connection is provided from the photodiode array to measuring electronics.

2. Description of the Prior Art

A radiation detector of the above type is disclosed in German OS 197 27 219. FIG. 1 herein as well as FIGS. 2 and 3 herein, which are taken from German OS 197 27 219 are used below for explaining problems addressed by the subject matter of the present invention.

The computed tomography apparatus shown in FIG. 1 has a measuring unit composed of an x-ray source ray I that emits a fan-shaped x-ray beam 2 and a radiation receiver 3 that is composed of a series of individual detectors, for example of 512 individual detectors. The focus is referenced 1 1. The patient 4 to be examined lies on a patient bed 5. For scanning the patient 4, the measuring unit 1, 3 is rotated around a measuring field 9, in which the patient 4 lies by 360°. The rotational axis is referenced 10. The x-ray source 1 that is supplied by a voltage generator 6 is operated to emit pulsed or continuous radiation. Given predetermined angular positions of the measuring unit 1, 3, sets of data are generated that are supplied from the radiation receiver 3 to a computer 7 that calculates the attenuation coefficients of predetermined picture elements from the generated data sets and visually reproduces these on a viewing monitor 8. Accordingly, an image of the transirradiated slice of the patient appears on the viewing monitor 8.

FIG. 1 also shows a gantry 14 on which the x-ray source I and the radiation receiver 3 are mounted. The rotation of the x-ray beam 2 ensues by means with of a drive mechanism 15 which engages the gantry 14.

The radiation receiver 3 is only schematically shown in FIG. 1. FIGS. 2 and 3 show the structure thereof in greater detail. As can be seen in FIG. 2 a number of individual detectors 16 are held in a formed part 17 composed of plastic, preferably an injection molded part, having a surface on which interconnects 18 are applied at both sides. Detector arrays can also be provided. Further, electronic components 19 (for example, ICs) are mounted on the formed part 17, these being electrically connected to one another by interconnects 18. The individual detectors 16 are also electrically connected to the electronic components 19 by the interconnects 18 on the formed part 17. The formed part 17 accordingly serves the purpose of holding the components 16, 19 and for their electrical connection.

As can be seen in FIGS. 1 and 3 the radiation receiver 3 is subdivided into individual detectors transversely relative to the rotational axis 10 as well as in the direction thereof, so that the simultaneous scanning of a number of slices of the patient 4 is enabled. The individual detectors 16 are connected to the interconnects 18 on the formed part 17 by contacts 20. A scintillator 21 for the conversion of the x-rays into visible light lies in front of the individual detectors 16, this visible light being converted into corresponding electrical signals by the individual detectors 16, fashioned as semiconductor detectors.

As can be seen from FIG. 2 the radiation receiver 3 is constructed of a number of modules 22, each module thereof comprising a formed part 17 with the components 16, 19. For example sixteen individual detectors 16 can thereby be provided per module, with a total number of, for example, 512 individual detectors being provided by thirty-two such modules 22. The modules 22 can be electrically connected to one another via cables 23 that are connected to molded plugs 24.

FIG. 3, which shows a view in the direction of the arrow III in FIG. 2, shows that the formed parts 17 are angled, with the individual detectors 16 mounted at the outside on the upper leg, and the electronic components 19 mounted in the inside of the angle. Some of the electronic components 19 are arranged on an inward projection 25. The angle is thereby closed by a covering 26, so that a box-shaped overall profile is produced (in cross-section) for the acceptance of the electronic components 19. A carrier plate 27 carries the modules 22 which are held thereon by catches 28. An adjustment (shim) fit pin 29 serves the purpose of aligning the shaped parts 17 to the focus 11 of the x-ray source 1.

SUMMARY OF THE INVENTION

An object of the present invention is to provide a radiation detector of the type initially described which can be economically manufactured while still achieving reliable electrical connections between the photodiode 3 and the measuring electronics.

This object is inventively achieved in a radiation detector having a scintillator and a photodiode array wherein a transparent film with interconnects is arranged between the scintillator and the photodiode array for the electrical connection of the photodiode array to a measuring electronics. As a result, particularly good electrical connections can be effected in a very tight space.

It is especially advantageous for the transparent film to be placed into connection with the measuring electronics via contact pads, since the photodiode array then can be electrically tested independently of the measuring electronics.

It is also advantageous for the transparent film with the contact pads to be placed into connection with the contacts of the measuring electronics by at least one resilient biasing element, since an easier replacement of the photodiode array as well as replacement of the measuring electronics are thus possible.

When photodiode arrays are arranged in a number of lines, then a number of slices can be scanned given a single transirradiation of an examination subject. Preferably, the scintillator has a ceramic substrate, particularly when the scintillator is a scintillating ceramic, and advantageously this scintillating ceramic carrier has individual tiles that are arranged in at least one row. Cross-talk, i.e. the transfer of light from one tile to another tile, is thus reduced, and as a result the resolution of the radiation detector is increased. In order to suppress the cross-talk, a reflector can be disposed between the tiles.

DESCRIPTION OF THE PREFERRED EMBODIMENTS

Figure 1:
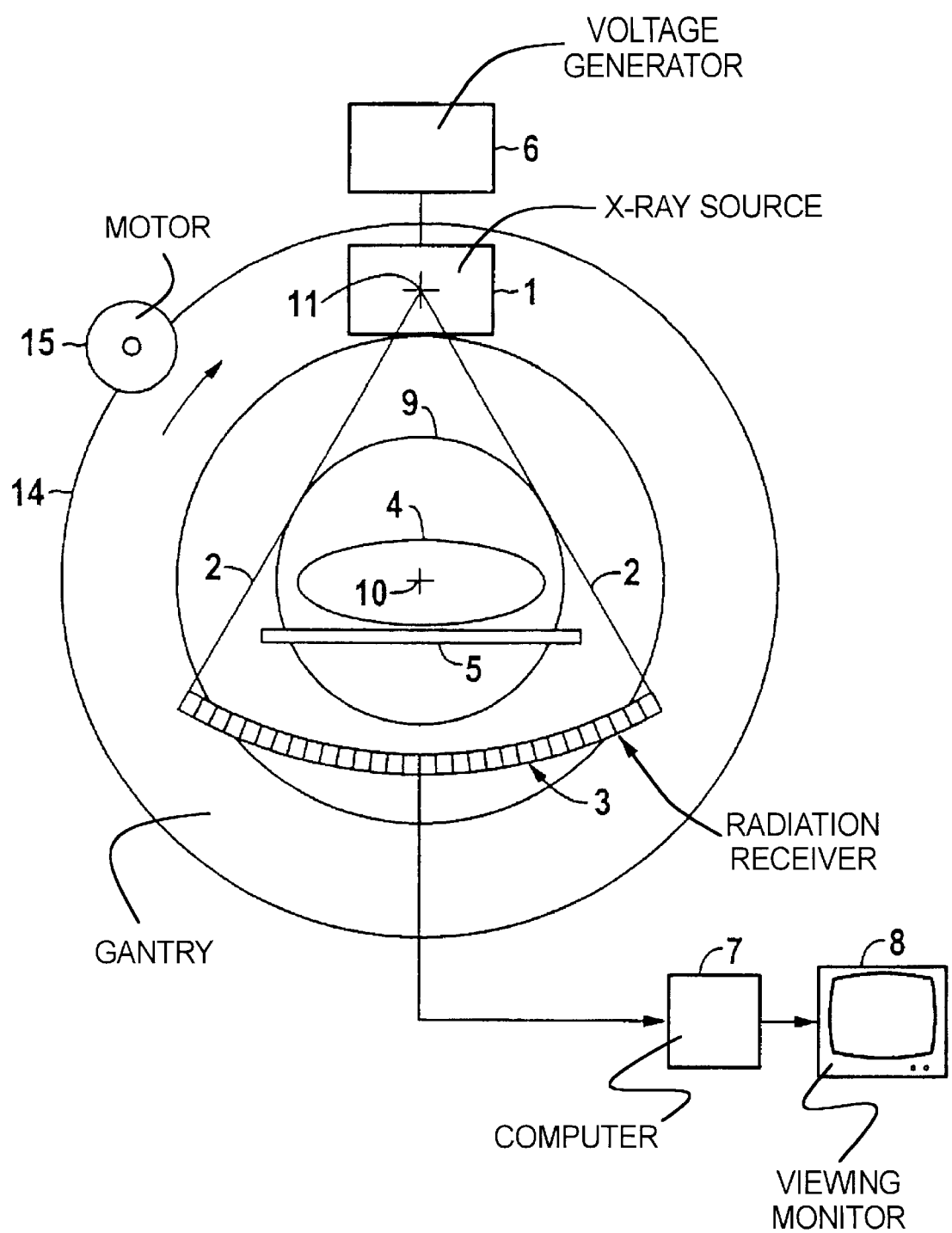
FIG. 1, as noted above, is a schematic illustration of the basic components of a conventional computed tomography apparatus.
Figure 3:
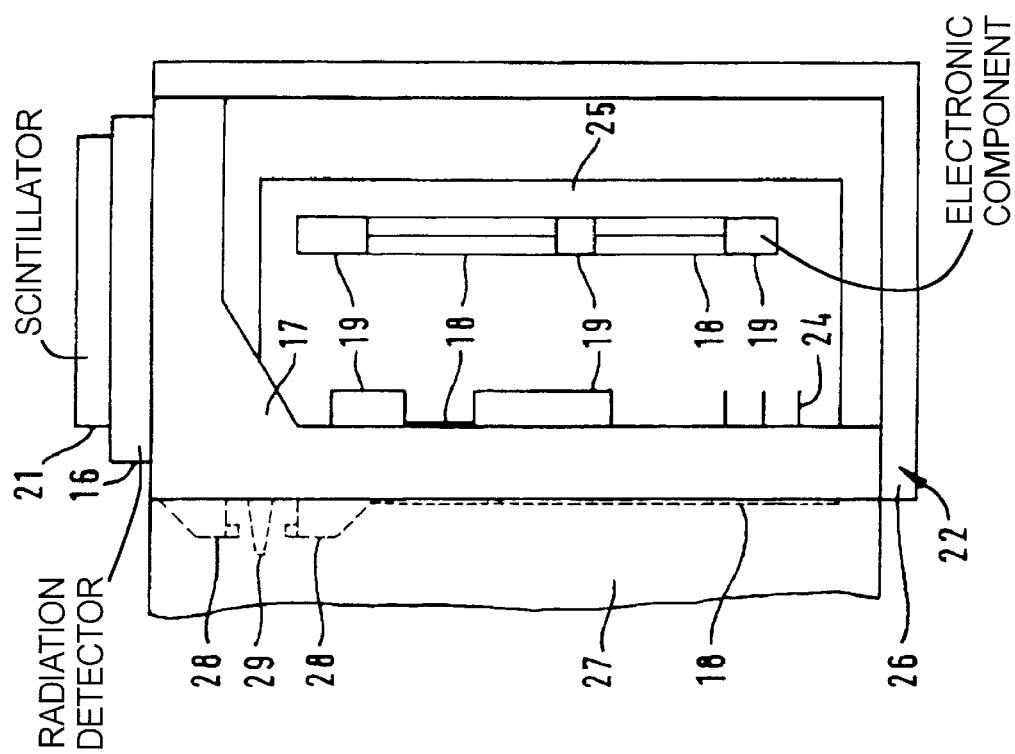
FIG. 3 is a view of the radiation detector in FIG. 2, as seen in the direction of the arrow III in FIG. 2.
Figure 2:
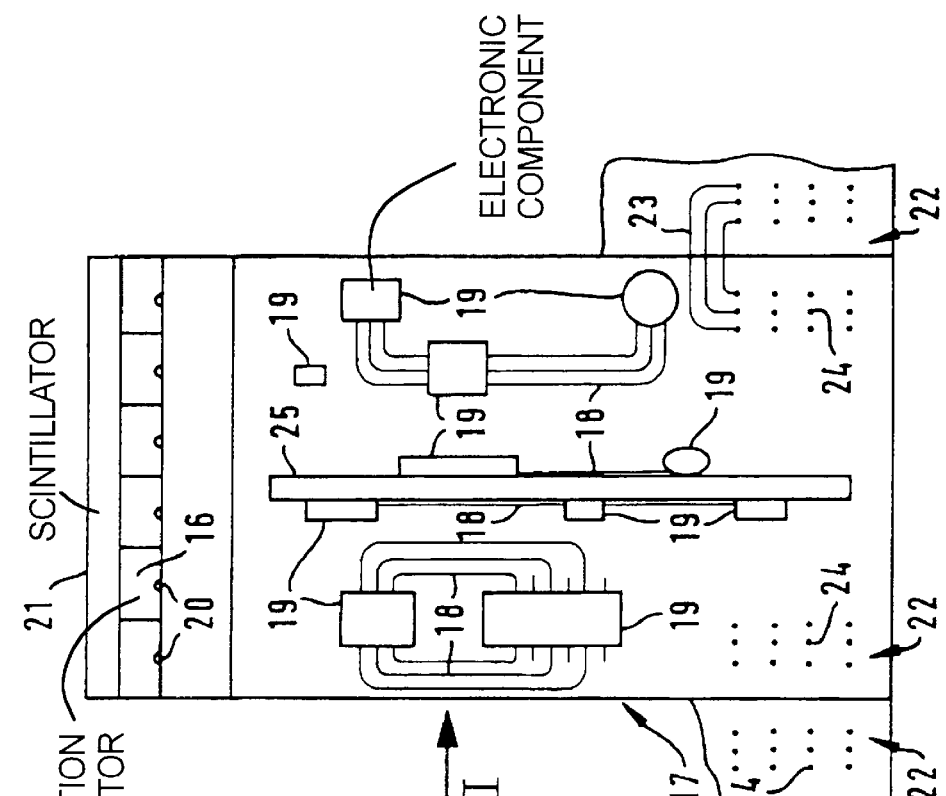
FIG. 2, as noted above, is a view of a known mounting arrangement for components of a radiation receiver and components of the measuring electronics, as described in German OS 197 27 219.
Figure 4:
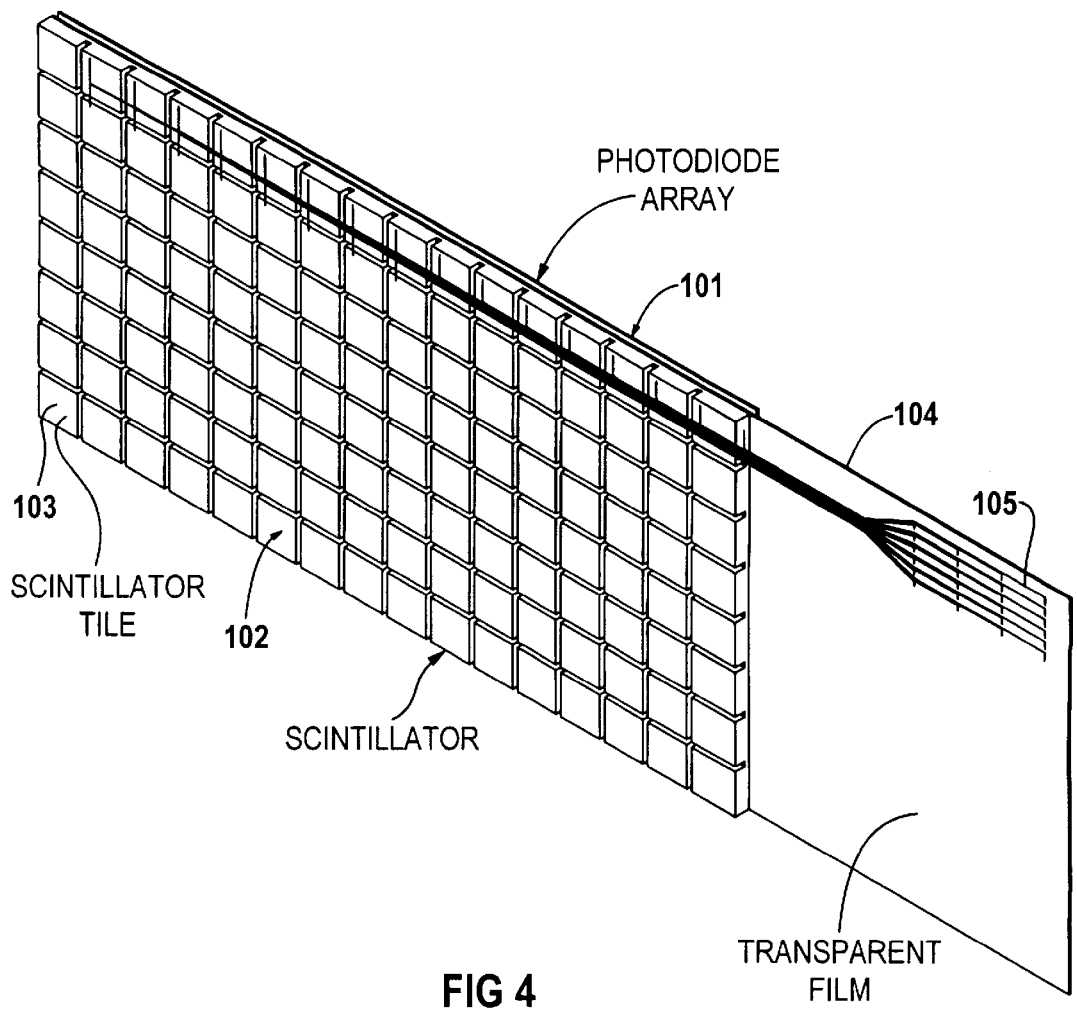
FIG. 4 is a perspective view of a radiation receiver for use in a computed tomography apparatus, constructed in accordance with the principles of the present invention.
Figures 5A, 5B:
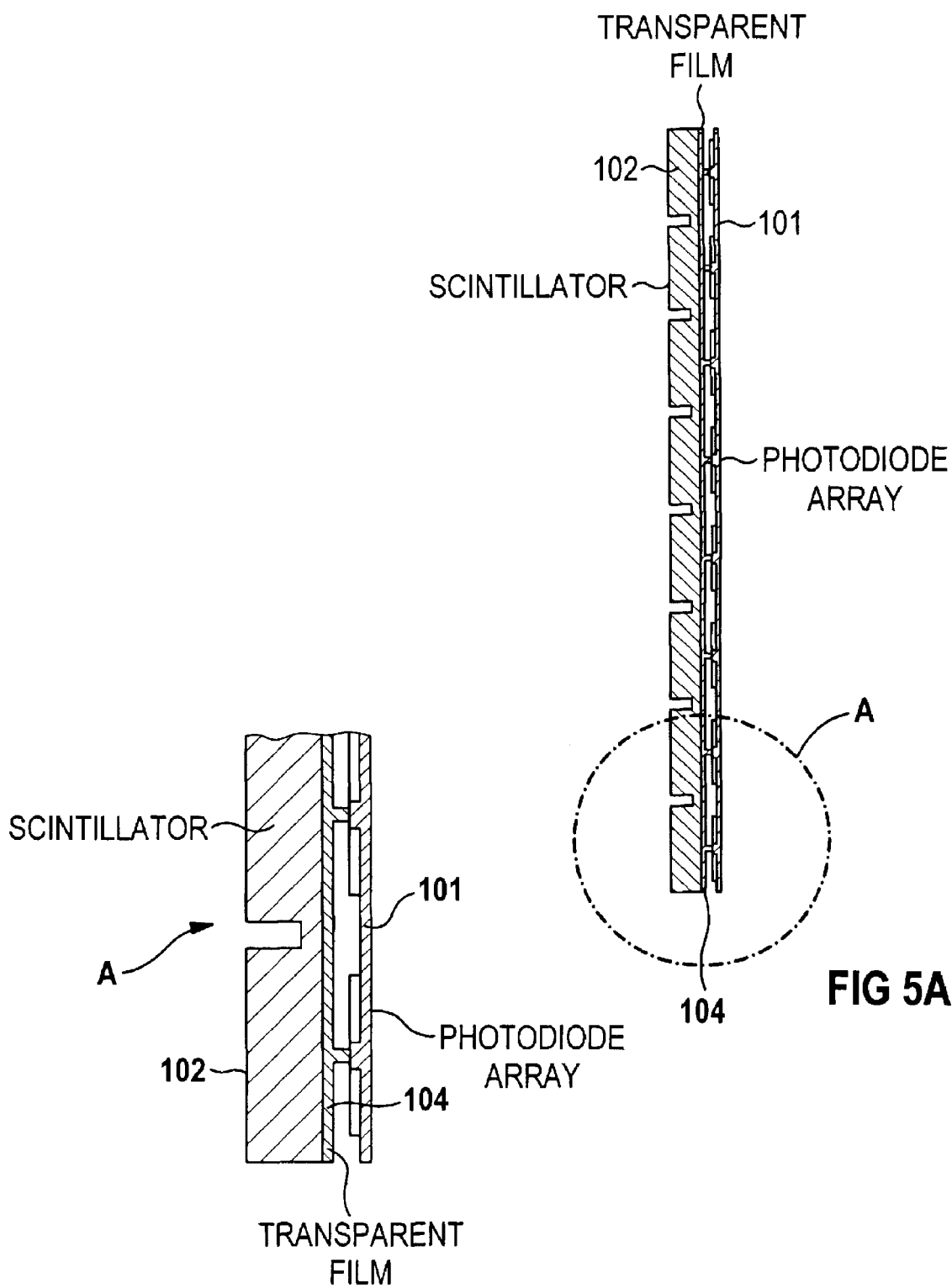
FIG. 5A is a side sectional view of the inventive radiation receiver.
FIG. 5B is an enlargement of the circled portion A in FIG. 5A.
Figure 6:
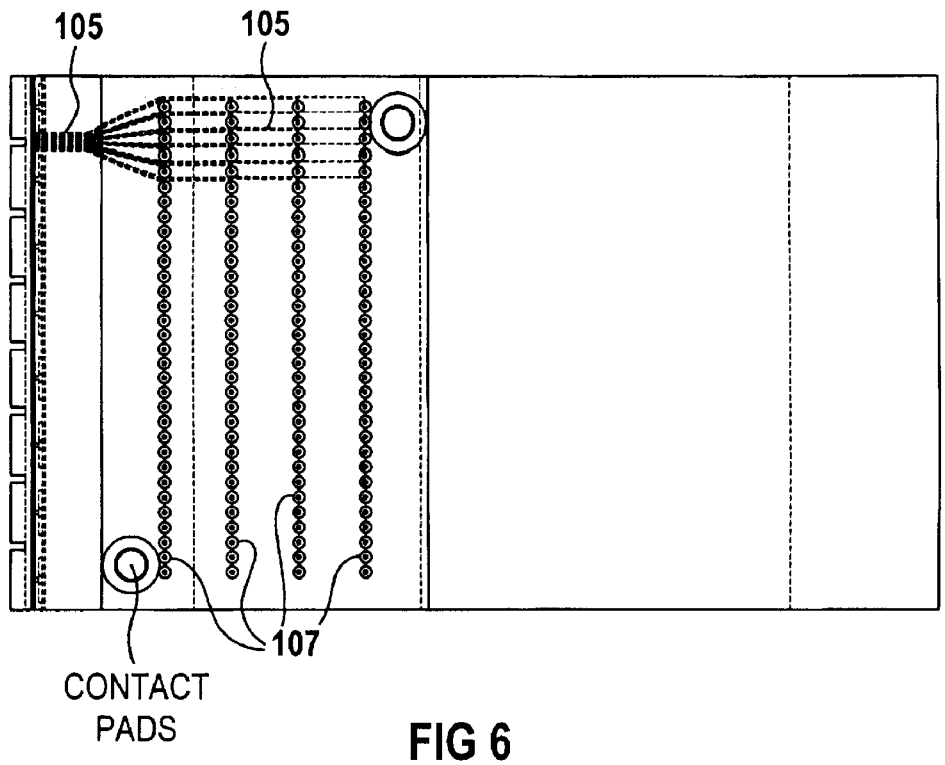
FIG. 6 shows connecting pads of the inventive radiation receiver.
Figure 7:
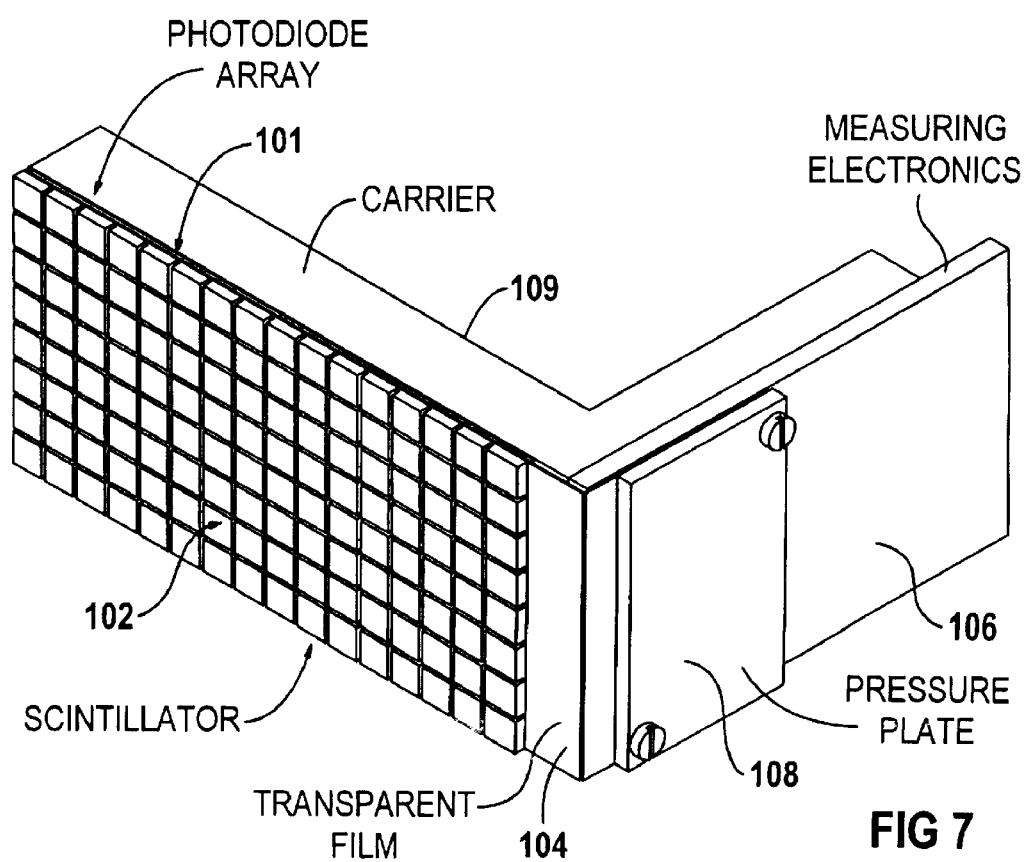
FIG. 7 shows the radiation receiver with measuring electronics mounted on a carrier, in accordance with the present invention.

In the figures, a photodiode array 101 converts light generated in a scintillator 102 into electrical signals. In the exemplary embodiment, the scintillator 102 is formed by a ceramic substrate in the form of individual tiles 103. The individual tiles 103 are arranged at least in one row, preferably in a number of rows or lines. Inventively, a transparent film 104 is arranged between the photodiode array 101 and the scintillator 102, interconnects 105 being formed on the film 104 that connect the individual photodiodes to measuring electronics 106 schematically shown in FIG. 7. "Transparent" means transparent to whatever wavelength range encompasses the light emitted by the scintillator 102. The transparent film 104 has contact pads 107 (FIG. 6) in the region of the measuring electronics 106 via which the photodiodes can be brought into connection with the measuring electronics 106. To make the photodiode array 101 with the scintillator 102 and the transparent film 104 as well as the measuring electronics 106 replaceable, the connection between the transparent film 104 and measuring electronics 106 is releasable. To achieve such reliability, for example, the transparent film 104 can be pressed against the measuring electronics 104 with a pressure plate 108. As shown in FIG. 7 the photodiode array 101, the scintillator 102, the transparent film 104 and the measuring electronics 106 are arranged in a common, for example angled carrier 109. Each correspondingly implemented carrier 109 forms at least one detector channel of a radiation detector, that is usually formed by a number of detector channels connected to one another.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiation receiver comprising:

a scintillator which converts incoming radiation into light;

a photodiode array on which said light is incident for conversion into electrical signals; and a transparent film sheet disposed between said scintillator and said photodiode array, said transparent film carrying a plurality of electrical connections adapted for electrically connecting the photodiode array to measuring electronics.

2. A radiation receiver as claimed in claim 1 wherein said transparent film further carries a plurality of contact pads respectively for said electrical connections, adapted for electrically connecting the respective electrical connections to measuring electronics.

3. A radiation receiver as claimed in claim 2 further comprising a pressure-applying element for producing a positive connection between said contact pads and measuring electronics.

4. A radiation receiver as claimed in claim 1 wherein said photodiode array comprises a plurality of photodiodes disposed in a plurality of lines.

5. A radiation receiver as claimed in claim 1 wherein said scintillator has a ceramic substrate.

6. A radiation receiver as claimed in claim 5 wherein said scintillator comprises a scintillating ceramic.

7. A radiation receiver as claimed in claim 6 wherein said scintillating ceramic comprises a plurality of individual tiles arranged in at least one line.

* * * * *